INVENTOR
JONATHAN N. KEEHN II.
By Harbaugh & Thomas
Attorneys

United States Patent Office 3,420,341
Patented Jan. 7, 1969

3,420,341
VARIABLE SHOCK ABSORBER
Jonathan N. Keehn II, 3006 Coolidge,
Oak Brook, Ill. 60521
Filed Oct. 16, 1967, Ser. No. 675,445
U.S. Cl. 188—88
Int. Cl. F16d 57/00
15 Claims

ABSTRACT OF THE DISCLOSURE

The disclosure describes a shock absorber of simple, rugged construction having variable jounce/rebound calibration ratios to accommodate both normal and severe road and driving conditions. In one embodiment the reciprocatable hydraulic piston within an hydraulic cylinder is divided laterally, one piston half is rotatably mounted in relation to the other and provision is made for variation of the degree of registry of orifices, and both jounce and rebound blow-off and restriction by-pass valves through said piston halves whereby the jounce-rebound calibrations of the shock absorber are controlled. Other embodiments are disclosed, including means to limit the degree of registry of the piston halves and means to accomplish said relative rotation.

Background of the invention

This invention concerns the art of dampening the relative movement of separate masses such as the dampening of unwanted oscillations between sprung and unsprung masses of a vehicle and the like. More particularly the invention relates to shock absorbers for use on vehicles, particularly automobiles, trucks and sports cars wherein the magnitude of the dampening forces acting between the moving parts or the jounce/rebound calibration is subject to control in accordance with the road and driving conditions.

Indirect and direct control of the magnitude of the dampening force exerted by a shock absorber is known in the art. One early winch-braking device, using the principle of a piston operating in a cylinder containing oil, employs a piston having relatively rotatable segments in stacked relationship which upon rotation through a remote control, responsive to the winch load, varies the effective cross-sectional area of the piston and the corresponding dampening force. No provision for control of rebound (decompression) is provided and devices of this kind are limited to steam driven machinery which is ill-adapted to regenerate the energy given up by the retardation of the load. These early shock absorbers exhibited little if any jounce and rebound dampening calibration.

A number of more recent developments in this art recognize the necessity of regulation of the amount of dampening in relation to the road conditions and employ spring-loaded regulating valves, slotted reciprocating or rotatable sleeve valves, longitudinally movable needle valves and spring-suspended stop buttons or valve plates. Where the amount of dampening is made to be proportional to the severity of the shock, it is difficult to prevent a lag in the dampening force or sufficient flexibility in operating capability, i.e., control of rebound without affecting jounce because of dependence on fixed diameter bleed orifices or bypass ports. Moreover, the important factor is that the resistance to the flow of the incompressible hydraulic fluid through an orifice increases as the square of the flow velocity. This automatically provides more dampening control under severe road conditions where the upward wheel and unsprung mass velocity is high. However, an orifice designed to give the required dampening force under severe road conditions has little control under low velocity or light road conditions and the necessary dampening of the unsprung mass is absent. The result is a jerky ride on smooth roads at low speeds with so-called high performance shock absorbers.

Blow-off valves in parallel with the primary orifices, designed to open at a predetermined pressure to relieve the restriction across the orifices, are used on modern shock absorbers. Smaller primary orifices can then be used for low-speed jerk control in conjunction with the secondary blowoff orifices to prevent the development of excessive dampening on larger bumps. Both jounce (compression) and rebound (decompression) forces must be controlled and blowoff valves are used for this purpose. In some designs the compression control valve is a spring-loaded poppet valve located at the base of the hydraulic cylinder and the decompression valve is a calibrated spring plate in the piston that unseats under high pressures. Unfortunately these designs do not provide the needed control for modern passenger cars, sports cars and racing cars negotiating harder bumps at higher speeds because once the blowoff valve opens, its dampening force cannot increase much at higher velocities except for the small effect of restriction due to the valve passages. Even with these combinations of three ranges of control, namely, orifice control, blowoff control and simple restriction control of the secondary valve passages, the dampening resistance on the jounce or compression stroke is only about ⅓ of the control of the rebound stroke at a given number of cycles of the piston per minute. Similarly the jounce control, where provided, is approximately ¼ of the total control. The jounce/rebound dampening distribution is therefore 25/75, where theoretically it should be 50/50, i.e. to provide equal dampening forces in both directions of travel of the unsprung weight and perform most efficiently in keeping the unsprung weight in contact with the road surface.

Unfortunately, equal dampening forces for the jounce and rebound phases do not provide the best ride since the dampening resistance of a shock absorber reacts against the sprung weight of the vehicle and is translated into a bump for the passenger. The jounce or upward stroke of the wheel is magnified more than the rebound or opposite force on the downward stroke of the wheel because the force of gravity acting on the body and chassis is additionally resisting the upward force. Most modern passenger car shock absorbers are a compromise, placing the most dampening force on the rebound stroke and have characteristic jounce/rebound calibration varying from about 20/80 to about 30/70, with consequent loss of the stiffness necessary for proper handling, road holding and road feel. These compromise calibrations become grossly inadequate when the vehicle is driven at higher than average speeds, especially on rougher roads or around corners at these higher speeds. Although the use of nylon seals around the piston, improved spring-loaded seals at the upper rod area, micro-finishing of the shock absorber piston, improved valves and orifices and shock absorber oils have increased the useful like of shock absorbers, there is still a need for a shock absorber which can offer both variations in jounce/rebound calibration and relative stiffness to combine the characteristics of riding comfort under normal or average conditions and high performance, in the order of 50/50 calibration, for above average road conditions.

Summary of the invention

This invention concerns a shock absorber which has a variable jounce/rebound calibration providing substantially finite control of orifice flow, blowoff and restriction of the secondary orifices to provide the characteristics of low ratio jounce/rebound calibration for a comfortable ride under normal conditions and increased or substantially equal ratio or jounce/rebound calibration combined with increased overall stiffness in both directions of the piston's movement, for abnormal conditions. A feature of this invention is to provide a shock absorber which combines the comfortable ride characteristics of a jounce/rebound calibration of between 20/80 to 30/70 and the high performance characteristics of 50/50 jounce/ rebound calibration and greater stiffness.

The shock absorber of this invention is further characterized by providing within the hydraulic piston control of orifice flow, blow-off flow and restrictor flow for both the jounce and rebound valves therein. This is accomplished by combining the jounce blow-off and restrictor orifices, combining the rebound blowoff and restrictor orifices, incorporating both the jounce blowoff and rebound blowoff valves with stop valves and proving control of both the jounce and rebound flow orifices, in a radially divided hydraulic piston. Means are provided for varying the registry of the combined flow orifices and blowoff valves, by lateral or circumferential displacement of the piston halves in relation to one another, into as many positions as are desired. In one embodiment the means to vary the registry of the piston halves is adapted for movement to and from a low speed normal jounce/rebound calibration and to and from a high speed abnormal jounce/rebound calibration with an intermediate setting for optimum handling characteristics of good stiffness and road feel with medium performance jounce/rebound calibration. In another embodiment, the means to vary the registry of the piston halves is adapted for movement between a low speed normal jounce/rebound calibration and a high speed abnormal jounce/rebound calibration. These embodiments are made possible by the particular orifice diameter ratios of the rebound and jounce valves blowoff or stop and their registry with or shut off from flow orifices in the opposed piston halves.

Accordingly, the primary objects of this invention are to provide a shock absorber of simple construction having within the hydraulic piston latrealy movable rebound and jounce blowoff valves, rebound and jounce flow orifices and restrictor orifices whereby the jounce/rebound calibration is variable within desired limits for moving the the piston halves in relation to one another. The jounce flow orifices are either variable or fixed as desired and both the jounce blowoff and rebound blowoff are adapted to be open or closed, or set at intermediate positions. Means are provided, as another object of this invention to control the limits of lateral movement of the piston halves and to control the relative circumferential movement thereof.

*Description of the drawings*

The specific embodiment of this invention is shown in the accompanying drawings wherein.

*The preferred embodiment*

Figure 1:
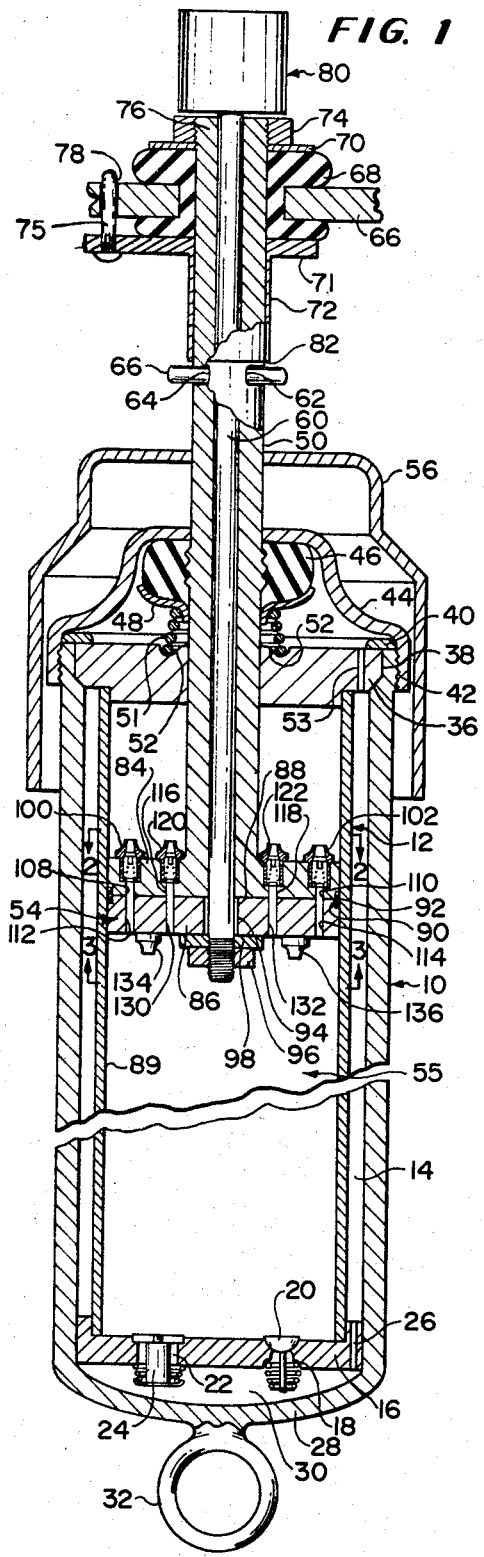
FIG. 1 is a side view in partial axial cross-section illustrating in general the relationship of the parts.

Referring to FIG. 1, the shock absorber is shown to include an outer cylinder 10 and an inner cylinder 12 disposed in concentric arrangement and with an annular reservoir 14 defined therebetween by the radially spaced relationship of the cylinders. A head assembly 16 closes the lower end of the inner cylinder 12 and is provided with a replenishing passage 18 controlled by a normally closed spring-actuated replenishing valve 20, and an impact or compression passage 22 controlled by a spring-pressed impact or compression valve 24. The head assembly 16 has one or more passages 26 in comunication with the annular reservoir 14. The lower end of the cylinder 10 is enclosed by means of the cap 28 which may be made integral with the sides as illustrated or be a separate piece and affixed to the cylinder wall by welding. The head assembly 16 and the cap 28 define therebetween a chamber 30 in communication with the reservoir 14 by means of the passages 26. An eye 32 is provided centrally on the outer side of the cap 28 for attachment of the shock absorber to the axle or other unsprung part of the vehicle. This construction of a shock absorber, thus far described, is well known in the art, and accordingly a more detailed description of these parts is unnecessary.

The opposite end of the inner cylinder 12 carries in securely mounted relationship a top closure plug 36, the outer marginal edge 38 of which is secured to the inner circumferential end of the outer cylinder 10 which is spun over at the edge 40 to secure these parts together in tightly sealed relationship. A sealing ring (not shown) may be provided at the edge 38 to insure leakproof construction.

The peripheral end of the outer cylinder 10 is threaded at 42 to receive the top retainer cap 44. The retainer cap 44 houses in its upper end the gasket 46 against the cup 48, held in leakproof relationship by means of the spring 51, nested therebetween and held at its base by means of the circumferential groove 52 in the top of the closure plug 36. A return duct 53 is provided communicating with the annulus 14 for fluid escaping past the rod guide or plug member 36. The retainer cap 44, the gasket 46, and the plug member 36 are provided with aligned openings in which the piston rod 50 is slidably mounted, carrying at its lower end within the chamber 55, the piston 54, later to be described. At the upper end of the rod 50, there is welded thereto a cap 56, from which depends a cylindrical shield in spaced concentric relationship with the cylinder 10. The annulus 14 compensates volume changes due to the displacement effect of the piston rod. The cap 56 may extend downwardly any desired length.

The piston rod has a central bore through which extends the control rod 60. The wall of the piston rod 50 has opposed circumferential slots 62 and 64 to receive the pin 66, extending through a corresponding cross bore in the control rod 60 whereby the control rod 60 is longitudinally fixed but can be rotated within the piston rod 50 to the limits of the length of the slots 62 and 64.

The top end of the piston rod 50 is affixed to the frame member 66, representing the sprung weight of the vehicle, by means of the rubber grommet 68 the lobes of which are held between the washer 70 on top and the flange 71 of the collar 72 on the bottom. The lock nut 74 engaging the threaded end 76 holds the assembly together in a conventional manner. Affixed to the top end of the control rod 60 is a means 80, to be described, for mechanically, electrically or electromechanically rotating the control rod 60 a limited amount within the piston rod 50. The lower end 82 of the collar 72 is spaced above the pin 66 and may be spot welded to the shaft 50 or otherwise affixed thereto. The pin 77 slidably engages the bore 78 to prevent rotation of the rod 50.

At the bottom of the piston rod 50 there is located the piston 54 comprising an upper piston half 84 and a lower piston half 86 each having opposed transverse smooth machined surfaces abutting one another as represented by the line 88. The upper piston half 84 is affixed to or a part of the piston rod 50 and is reciprocatably mounted within the chamber 55. The circumferential surface of both piston halves is smoothly machined and polished for close oil-tight fit with the inner wall 89 of the inner cylinder 12. A circumferential groove 90 is provided in both piston halves to accommodate a resilient seal or piston ring 92. The bottom end of the control rod 60 has a squared or hexagon shank 94 which mates with a corresponding central opening in the lower piston half 86 and the latter member is affixed thereto by means of the lock nut 96 and the lock washer 98 so that the bottom piston half is rotatable with the control rod 60 and at the same time the piston halves reciprocate as a unit. The seal 92, to be described in more detail in relation to FIG. 4, has a cross-sectional configuration such that its longitudinal depth is greater than the radial thickness and the sides are concave to allow sufficient internal and marginal resilience to remain in sealed relationship with the wall 88 while the piston halves 84 and 86 are rotated slightly in relation to each other. Means other than the pin 77 may be provided to prevent the piston rod 50 from rotating.

In FIG. 1 the piston 54 has been sectioned along a diameter. This sectioning passes through the jounce blowoff valves 100 and 102 affixed to the upper piston half 84. These valves will be described in more detail in relation to FIG. 4. Any number of jounce blowoff valves can be used and in one embodiment there are four jounce blowoff valves circumferentially spaced around the periphery of the top piston half 84, as will also be described. The jounce blowoff valve 100 controls the liquid communication and flow through the jounce blowoff ports 108, and the jounce blowoff valve 102 controls the jounce blowoff port 110, both of which ports are located in the upper piston half 84. The sectioning of the piston 82 along its diameter in FIG. 1 also reveals a pair of the jounce blowoff orifices 112 and 114 in the lower piston half 86. The jounce flow ports 108 and 110 are substantially cylindrical bores while the jounce flow orifices 112 and 114 are circumferential slots having an effective flow area which is the same as that of the jounce flow ports or gradually less than the effective flow area of the jounce flow ports, depending on their relative positions, as will be described.

As shown the ports 108 and 110 register with the orifices 112 and 114 to provide passageways through the piston halves, controlled by the jounce blowoff valves 100 and 102, respectively. Each of the remaining jounce blowoff valves (not shown in FIG. 1) in piston half 84 has a corresponding jounce flow port extending through to and registering with a jounce flow orifice in the lower piston half 86 to provide similar fluid communication. Throughout the description the word port will be used to indicate a substantially cylindrical bore hole forming a passageway for the hydraulic fluid, while the word orifice will be used to indicate either a circumferential slot having uniformly spaced side walls or a circumferential slot which may taper radially in either direction.

The sectioning of the piston 84 on the diameter also reveals a pair of low speed primary ports 116 and 118 located within and extending through the upper piston half 84. These are substantially cylindrical bores and are controlled by the low speed jounce valves 120 and 122 in the same manner as the valves 100 and 102. Any type of spring-loaded valve can be used for primary jounce control.

The low speed primary ports 116 and 118 register with a pair of primary ports 130 and 132, extending through the lower piston half 86 and have substantially the same cylindrical bore size. Flow through these ports takes place only on jounce (downward movement of the piston 54) when the relative rotational position of the piston halves 84 and 86 is as shown in FIG. 1. As will be shown the rotation of the piston halves in relation to one another causes the primary ports 116–118 and 130–132 to no longer register and thus deactivate the low speed jounce valves 120 and 122. Not shown in FIG. 1, but subsequently to be described, are a pair of primary flow ports in the upper piston half adapted to register with a pair of primary flow orifices in the lower piston half (circumferential slots), so that they are always open regardless of the position of the piston half 84 with the piston half 86. FIG. 1 also shows a pair of rebound blowoff valves 134 and 136 provided in the lower piston half 86.

Figure 2:
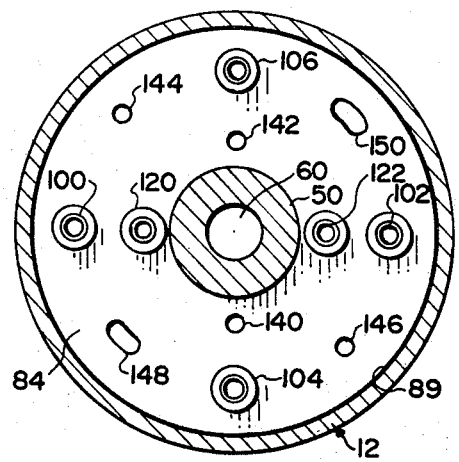
FIG. 2 is a cross-sectional view taken along lines 2—2 of FIG. 1.
Figure 6:
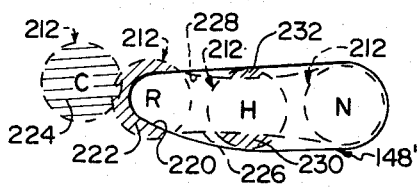
FIG. 6 is a diagrammatic view to show four different stages of orifice restriction contemplated by this invention.

FIG. 2 is a top view of the upper piston half 84 showing more clearly the parts just described and an illustrative radial and circumferential relationship upon the top of the piston. The jounce blowoff valves 104 and 106 are here shown positioned 90° from the jounce blowoff valves 100 and 102, and radially spaced from the primary ports 140 and 142 to which general reference has been made. Similarly positioned are the rebound blowoff stop ports 144 and 146 and the rebound blowoff flow orifices 148 and 150, whose relationship to the rebound blowoff valves will be described. The generally arcuate circumferential shape of the orifices is illustrated by the orifices 148 and 150 in FIG. 2, but other embodiments of these orifices are shown in FIG. 6.

Figure 3:
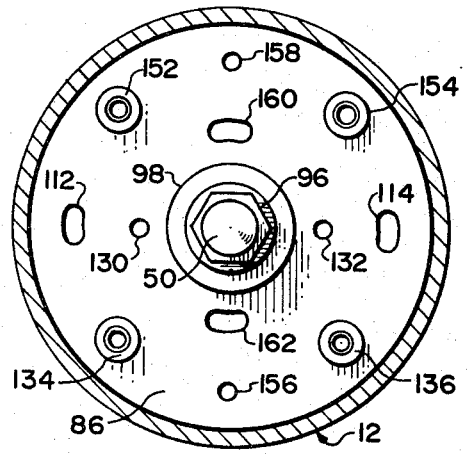
FIG. 3 is a plan view of the bottom half of the piston assembly of this invention, e.g. taken along lines 3—3 of FIG. 1.
Figure 4:
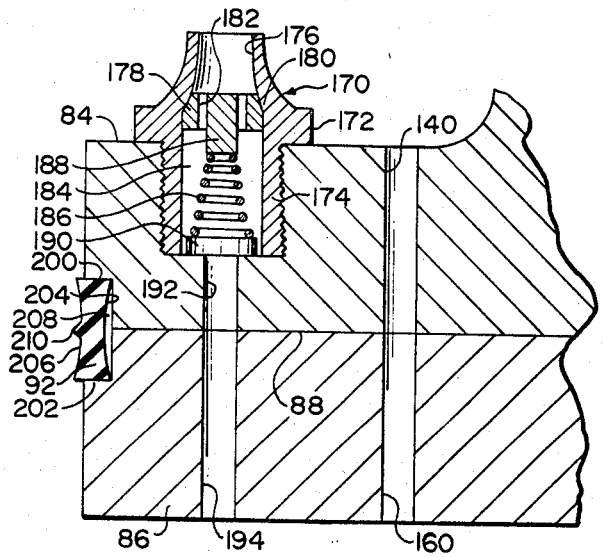
FIG. 4 is a fragmentary cross-sectional view to illustrate the structure of one of the valves and one form of sealing ring.
Figure 5:
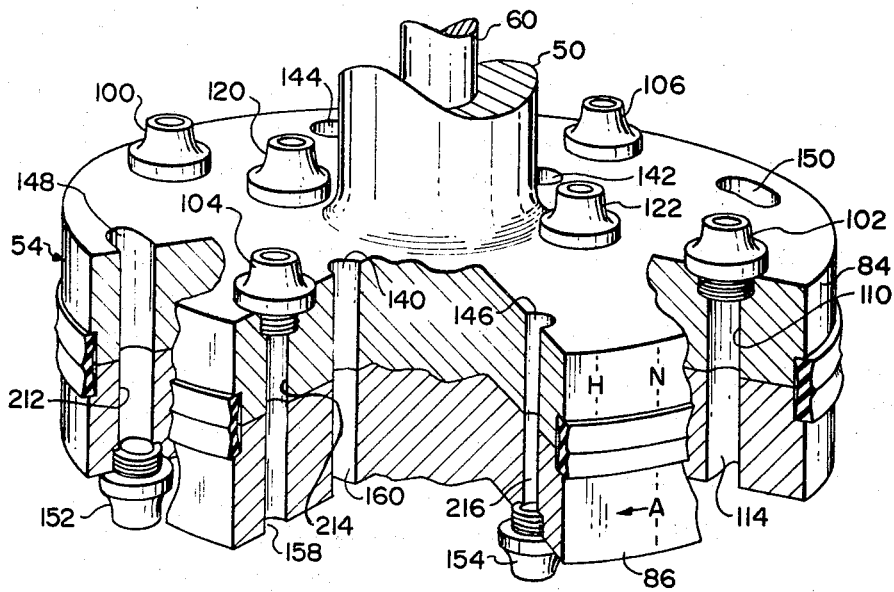
FIG. 5 is a perspective view of the piston assembly of this invention wtih the bottom half rotated to a first or normal position in relation to the top half and with partially sectioned and cutaway portions to show the relationship of parts in more detail.

FIG. 3 is a bottom view of the lower piston half 86 showing the circumferential spacing between the rebound blowoff valves 134 and 136. Where four such rebound valves are used, the remaining two illustrated at 152 and 154 are preferably equally spaced both radially and circumferentially. Each rebound valve has a rebound port extending through the piston half as shown in FIGS. 4 and 5 and a corresponding stop port or control orifice, as desired, in the upper piston half 84, cooperates therewith to stop the rebound flow or allow it to proceed at the same or diminished rate. FIG. 3 also shows the jounce blowoff stop ports 156 and 158. The ports 156 and 158 are radially spaced from the primary control orifices 160 and 162. Since FIG. 2 is a top view of the piston 54 and FIG. 3 is a bottom view of same and the circumferential and radial relationship about the center of the piston is as shown, the correspondingly positioned ports register in the opposed position of FIG. 1, i.e., valve 106 with port 156 which register through to and are controlled by the jounce valves 104 and 106.

FIG. 4 is a representative cross-section through one type of spring-loaded valve that can be used as a jounce, a rebound or primary orifice control and thus represents the construction of the jounce blowoff valves 100, 102, 104 and 106; on the top piston half 84; the rebound blowoff valves 134, 136, 152 and 154 on the bottom piston half 86 and the primary orifice control valves 120 and 122.

These valves comprise a housing 170 with a base 172 having a threaded shank 174 adapted to be screwed into a corresponding threaded bore in the face of a piston half, i.e., 84. The housing 170 has a port 176 with a transverse restrictor baffle 178 engaged by the curved circumferential shoulder 180 at its base. The baffle 178 has a pair of restrictor bores 182 therethrough communicating with the internal passage 184 which forms a housing for the spring 186. A boss 188 extends from the underside, and between the bores 182, of the baffle and is affixed to one end of the spring 186 by any means such as welding. The other end of the spring 186 is similarly affixed to the disc-like valve member 190 and is held centrally over the port 192 which is representative of ports 108, 116, etc. (FIG. 1). The port 192 registers with a passageway 194 in the lower piston half 86 representing either a stop port, i.e., 156 or a control orifice, i.e., 112.

Also illustrated in FIG. 4 is a typical primary port 140 extending through the upper piston half 84 and registering with a control orifice 160, the latter being a circumferential slot through the piston half 86 which always registers with the port 140 regardless of the positions of the piston halves 84 and 86 to provide a fixed degree of both jounce and rebound control at low and high speeds.

The piston halves 84 ad 86 have matching circumferential opposed shoulders 200 and 202 defining the groove 90 therebetween which receives the resilient sealing ring 92. This ring has opposed inner and outer concave surfaces 204 and 206 to provide resilience centrally within its cross section so that the piston halves can be rotated in relation to one another without distortion of the seal at the shoulders. Any hydraulic fluid which leaks through the juncture 88 of the piston halves is retained in the annulus 208 defined by the surface 204 of the resilient ring. In one embodiment a central circumferential lip 210 is provided on the outside of the ring which is forced outwardly by hydraulic pressure in the groove 90 against the cylinder wall 88 to increase the seal around the piston.

Referring to FIG. 5, the general over-all relationship of these parts is shown in the piston set for normal low speed operation as indicated by the position of the arrow line A on the piston half 86 opposite the N position of the piston half 84. With this "normal" position of the piston halves 84 and 86, with respect to each other the primary valves 120 and 122 with their associated ports 116 and 118 are in communication with the primary ports 130 and 132.

The sectioning of the piston 54 in FIG. 5 also shows the port 212 for the rebound control valve 152 and its relationship with the control orifice 148; the relationship of the jounce control valve 104 and its port 214 with the shutoff port 158; the relationship of the rebound control valve 154 and its port 216 with the shutoff port 146 and that the jounce control valve 102 and the port 110 are in communication with the control orifice 114 (as in FIG. 1), in the "normal" position. It is to be understood that the corresponding parts of the piston not sectioned or not shown in FIG. 5 are also in the "normal" position, that is, the rebound control valve 136 and its port are in communication with the control orifice 150; in the same manner as the valve 152 and orifice 148, the port 156 is in communication with the jounce control valve 106, in the same manner as the port 158 and the jounce control valve 104; the rebound control valve 134 is in communication with the port 144, in the same manner as the rebound control valve 154 and the port 146; and the jounce control valve 100 and its port 108 are in communication with the control orifice 112.

In the embodiment shown in FIGS. 1, 2, 3 and 5 the low speed or low performance primary jounce valves 120 and 122, the primary orifices 140 and 142, and the jounce blowoff and rebound blowoff valves on respective piston halves are all functioning to produce a jounce/ rebound calibration in the lower range, e.g., about 20/80 to about 30/70 for a comfortable ride under normal conditions. When however, the lower piston half is rotated in the direction of the arrow to a position where line A registers with the H position the low speed primary jounce valves 120 and 122 are closed since their ports can no longer communicate with the ports 130 and 132; the primary ports 140 and 142 are still open to the orifices 160 and 162, the jounce blowoff valves 100 and 102 are still open to their corresponding control orifices 112 and 114 as are the rebound blowoff valves 136 and 152; but the jounce blowoff valves 104 and 106 as well as the rebound blowoff valves 134 and 154 are closed, to produce a jounce/rebound calibration in the order of 50/50.

In still another embodiment of this invention finite control of the jounce/rebound calibration of the shock-absorber is provided by shaping the control orifices in either piston half so that the walls diverge or converge to form increased or decreased fluid flow areas. By using spring-biased control valves of relatively small size in relation to the piston area, more of such valves can be used and their placement can be such that a relatively small radial displacement of the piston halves accomplishes a large change in the jounce/rebound calibration.

FIG. 6 is a diagrammatic illustration of the port 212, shown as a dotted circle and represented in four positions N for normal, H for high performance, R for racing and C for closed, as it is moved, in the piston half 86 relative to the control orifice 148' shown by means of the full line to have a generally arcuate cross-section, in full registry with the port 212 in positions N and H and having a narrow section 220 wherein, in position R the effective flow area through the piston has been reduced by the shaded area 222. At position C the port 212 is closed, as shown by the shaded area 224. The broken lines 226 and 228 show an altered cross-section of the control orifice 148', as another embodiment, wherein in position H the effective flow area through the piston has been reduced by the shaded areas 230 and 232. As still another alternative the cross-sectional configuration of the control orifice 148' can be modified by one or the other of the inwardly directed wall portions 226 and 228. It is also apparent that the control orifices such as 148' do not need to be a continuous circumferential slot and can be separate ports of different diameters, located to register with the port 212, to control the effective flow areas in the manner shown in FIG. 6. The use of continuous, gradually diverging or converging walls in the control orifices results in smoother flow and more gradual and uniform changes in the jounce/rebound calibrations produced.

The control means 80 can be mechanical, that is a lever or rack and pinion which is manually operated or moved by a hydraulic piston. The lever, rack or pinion can be moved mechanically or through an oil pump. An arrangement similar to the power steering units for automobiles can be used where a reciprocating movement is obtained through a double acting piston. The lever used in this embodiment would be affixed at one end to the end of the rod 60 and pivoted at its other end by a pedal lever or pedal-linkage, from the floor boards or cockpit of the vehicle. A pinion can be affixed to the extended end of the rod 60 and be engaged by a rack which is mechanically reciprocated. Since the relative movement of the piston halves is no more than about 10°, depending on the dimensions of the ports of the piston, mechanical linkages of this type are readily fabricated by one skilled in the art.

The means 80 can be an electromagnet or solenoid wherein the magnetic field operates upon a core, one end of which is linked to the rod 50 whereby the passage of current through the magnet, moves the core and rotates the rod 50. In such devices the pull obtained can vary directly as the number of ampere-turns in the coil or as the square of the current, depending on the design and extent to which the core is saturated by the field. Such devices can be operated from the vehicles electrical system through either mechanical switches or relay switches.

The invention accordingly concerns any snubbing device having a sealed tubular-walled fluid chamber wherein the fluid is gaseous or liquid and is preferably a hydraulic oil composition, with a first and a second piston member reciprocally mounted on separate axes contiguous to each other with the fluid on the outer sides of each member and with the piston member having means biasing them together, and a one-way valve means in the piston members, ports through the piston members normally registering with the one-way valves and means to rotate the piston members relative to one another whereby the registry of the one-way valves with their ports is varied and the passage of fluid therethrough to each side of the piston members is controlled. A feature of the invention is the provision of a circumferential elongated orifice through one of the piston members for passage of the fluid therethrough which upon rotation of the piston members relative to one another still provides a passageway through the piston or by using an orifice with converging side walls provides a variable restriction in one or both directions. By providing the primary orifices and primary low speed control valves in combination therewith a double-acting variable jounce/rebound calibration shock absorber is provided.

Although but one specific embodiment of this invention has been herein shown and described, it will be understood that details of the construction shown may be altered or omitted without departing from the spirit of the invention.

What is claimed is:

1. A snubbing device attachable between relatively moving parts comprising:
   (a) a sealed tubular-walled fluid chamber one end of which is adapted to be affixed to one of said moving parts,
   (b) a first and a second piston member reciprocally mounted on separate axes contiguous to each other with said fluid on the outer sides of each and with their peripheral surfaces in fluid sealed sliding relationship with said walled chamber,
   (c) means biasing said first and second piston members into said contiguous relationship and adapted to be affixed to the other of said moving parts,
   (d) one-way valve means in said first piston member adapted to allow said fluid to pass from its outer side through said first piston member,
   (e) a port through said second piston member normally registering with said one-way valve means in said first piston member for passage of said fluid therethrough,
   (f) one-way valve means in said second piston member adapted to allow said fluid to pass from its outer side through said second piston member,
   (g) a port through said first piston member normally registering with said one-way valve means in said second piston member for passage of said fluid therethrough.
   (h) and means for rotating said first and second piston members relative to one another whereby said registry of said one-way valves with their respective ports is varied and the passage of said fluid therethrough upon reciprocation of said piston members with said chamber is controlled.

2. A snubbing device in accordance with claim 1 in which
   (a) said means biasing said first and second piston members into contiguous relationship comprises,
   (b) a hollow shaft extending through one end of said fluid chamber and affixed centrally to said first piston member,
   (c) a control shaft extending through said hollow shaft and through said first piston member and affixed centrally to said second piston member, and
   (d) said means for rotating said first and second piston members relative to one another is connected to said shafts.

3. A snubbing device in accordance with claim 1 in which
   (a) said one-way valves comprise a valve body having an inner passageway communicating with a port through the piston member retaining same,
   (b) a valve seat in said passageway,
   (c) a spring-biased valve member against said valve seat fluid pressure on one side of said valve member opens said valve and fluid pressure on the other side closes said valve.

4. A snubbing device in accordance with claim 1 in which
   (a) said piston members are rotatable to selected relative positions including an unrestricted normal position, a partially restricted high performance position, a more restricted higher performance position and a closed position.

5. A snubbing device in accordance with claim 1 in which
   (a) said first and second piston members have a circumferential groove at their interface defined by radial opposed shoulders,
   (b) a circumferential resilient sealing ring within said groove,
   (c) said ring having a radial depth greater than said groove and having an inner concave surface spaced from the bottom of said groove whereby said ring is flexed in opposed directions along its circumference by the relative movement of said piston members.

6. A snubbing device in accordance with claim 5 in which
   (a) the outer surface of said resilient sealing ring is concave and has a central circumferential rib engageable with the inner wall of said fluid chamber.

7. A snubbing device in accordance with claim 1 including
   (a) a second port through said first piston member for passage of said fluid therethrough, and
   (b) a circumferential elongated orifice through said second piston member for passage of said fluid therethrough and normally registering with said second port in said relative rotational positions of said piston members.

8. A snubbing device in accordance with claim 7 in which
   (a) said orifice has converging opposed walls along a portion of its length whereby in a relative rotative poisition of said piston members the fluid flow passage therethrough is restricted.

9. A snubbing device in accordance with claim 7 in which
   (a) said first and second piston members are rotatable with respect to one another so that the fluid passageway therebetween is closed.

10. A snubbing device in accordance with claim 1 including
    (a) a second one-way valve means in said first piston member adapted to allow said fluid to pass from its outer side through said first piston member,
    (b) a circumferential elongated orifice through said second piston member for passage of said fluid therethrough and normally registering with said second one-way valve means in said relative rotational positions of said piston members.

11. A snubbing device in accordance with claim 10 including
    (a) a second one-way valve in said second piston member adapted to allow said fluid to pass from its outer side through said second piston member,
    (b) a circumferential elongated orifice to said first piston member for passage of said fluid therethrough and normally registering with said second one-way valve in said second piston member in said relative rotational positions of said piston members.

12. A snubbing device in accordance with claim 11 including
    (a) a second port in said first piston member,
    (b) a second port in said second piston member,
    (c) said ports being radially disposed in the same plane from the axes of said piston members and registerable one with the other for fluid flow through said piston members in one position of their relative rotation whereby said snubbing device exhibits a low jounce/rebound calibration in a first position of said piston members in relation to one another and a higher jounce/rebound calibration in a second position wherein said first and second ports and said first and second one-way valves in said first and second piston members, respectively, are not in registry.

13. A snubbing device in accordance with claim 12 including
    (a) a third port in said first piston member,
    (b) a second circumferential elongated orifice through said second piston member for passage of said fluid therethrough and normally registering with said third port in said first piston member in said relative rotational positions of said piston members.

14. A snubbing device in accordance with claim 13 in which
   (a) said circumferential elongated orifices have walls conforming with said ports in a normal position, and converging walls of lesser cross-sectional flow area in a second position, and
   (b) said piston members are rotatable with respect to each other to register said ports with said normal and second positions of registry with said orifices.

15. A snubbing device in accordance with claim 14 in which
   (a) said piston members are rotatable to a relative position whereby at least one of said ports in each piston member is closed to adjust the jounce/rebound calibration of said device.

References Cited

UNITED STATES PATENTS 2,391,682  12/1945  Cramer _____ 188—96.2 XR

FOREIGN PATENTS 1,295,114  4/1962  France.
25,918  9/1910  Great Britain.

GEORGE E. A. HALVOSA, *Primary Examiner.*

U.S. Cl. X.R.

188—100